United States Patent
Osano et al.

(10) Patent No.: US 9,051,472 B2
(45) Date of Patent: Jun. 9, 2015

(54) EXFOLIATED GRAPHITE OXIDE DERIVATIVE, RESIN COMPOSITE MATERIAL THEREOF, AND PROCESS FOR PRODUCING SAID RESIN COMPOSITE MATERIAL

(75) Inventors: Keiichi Osano, Osaka (JP); Katsunori Takahashi, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 13/982,254

(22) PCT Filed: Mar. 13, 2012

(86) PCT No.: PCT/JP2012/056342
§ 371 (c)(1),
(2), (4) Date: Jul. 26, 2013

(87) PCT Pub. No.: WO2012/128114
PCT Pub. Date: Sep. 27, 2012

(65) Prior Publication Data
US 2013/0310499 A1    Nov. 21, 2013

(30) Foreign Application Priority Data

Mar. 23, 2011  (JP) .................................. 2011-064765
Apr. 6, 2011   (JP) .................................. 2011-084188

(51) Int. Cl.
| | | |
|---|---|---|
| C09C 1/46 | (2006.01) | |
| C08K 9/06 | (2006.01) | |
| C08K 9/04 | (2006.01) | |
| C08L 23/02 | (2006.01) | |
| C08L 23/10 | (2006.01) | |
| C01B 31/04 | (2006.01) | |
| C08J 5/00 | (2006.01) | |

(52) U.S. Cl.
CPC . *C09C 1/46* (2013.01); *C08L 23/02* (2013.01); *C08K 9/04* (2013.01); *C08K 9/06* (2013.01); *C08L 23/10* (2013.01); *C01B 31/043* (2013.01); *C08J 5/005* (2013.01); *C08J 2323/02* (2013.01); *C08J 2323/10* (2013.01)

(58) Field of Classification Search
CPC ............... C08K 9/04; C08K 9/06; C09C 1/46
USPC .................. 524/264, 285; 554/151, 161, 163; 560/351; 556/466
See application file for complete search history.

(56) References Cited

U.S. PATENT DOCUMENTS

| | | | |
|---|---|---|---|
| 8,053,508 B2 * | 11/2011 | Korkut et al. ................. | 524/495 |
| 2007/0092432 A1 | 4/2007 | Prud'Homme et al. | |
| 2011/0014492 A1 * | 1/2011 | Joshi et al. ..................... | 428/626 |

FOREIGN PATENT DOCUMENTS

| | | |
|---|---|---|
| CN | 101287679 A | 10/2008 |
| CN | 101970720 A | 2/2011 |
| JP | 2005-264059 A | 9/2005 |
| WO | WO-2010/115173 A1 | 10/2010 |

OTHER PUBLICATIONS

International Search Report for the Application No. PCT/JP2012/056342 mailed May 1, 2012.
Written Opinion of the International Searching Authority (PCT/ISA/237) for Application No. PCT/JP2012/056342 mailed May 1, 2012.
Zhu, Yanwu et al., "Graphene and Graphene Oxide: Synthesis, Properties, and Applications", Advanced Materials, 2010, vol. 22, pp. 3906-3924.
Stankovich, Sasha et al., "Synthesis and exfoliation of isocyanate-treated graphene oxide nanoplatelets", Carbon: 2006, vol. 44, pp. 3342-3347.
Dreyer, Daniel R. et al., "The chemistry of graphene oxide", Chemical Society Reviews, 2010, vol. 39, pp. 228-240.
Nethravathi, C. et al., "Chemically modified graphene sheets produced by the solvothermal reduction of colloidal dispersions of graphite oxide", Carbon, 2008, vol. 46, pp. 1994-1998.
English Translation of Written Opinion of the International Searching Authority (PCT/ISA/237) for Application No. PCT/JP2012/056342 mailed Oct. 3, 2013.
Stankovich, Sasha et al., "Graphene-based composite materials", Nature, 2006, vol. 442, pp. 282-286.
Kuilla, Tapas et al., "Recent advances in graphene based polymer composites", Progress in Polymer Science, 2010, vol. 35, pp. 1350-1375.
Supplementary European Search Report for the Application No. EP 12 76 0955 dated Sep. 4, 2014.
The First Office Action for the Application No. 201280011862.3 from The State Intellectual Property Office of the People's Republic of China dated Sep. 11, 2014.

* cited by examiner

*Primary Examiner* — Robert Harlan
(74) *Attorney, Agent, or Firm* — Cheng Law Group, PLLC

(57) ABSTRACT

There are provided an exfoliated graphite oxide derivative excellent in dispersibility in a thermoplastic resin, a resin composite material of the exfoliated graphite oxide derivative and a thermoplastic resin, and a process for producing the resin composite material. The exfoliated graphite oxide derivative is obtained by reacting an exfoliated graphite oxide having a C/O ratio as determined by elemental analysis of 8 or less with a compound having a specific structure.

7 Claims, No Drawings

EXFOLIATED GRAPHITE OXIDE DERIVATIVE, RESIN COMPOSITE MATERIAL THEREOF, AND PROCESS FOR PRODUCING SAID RESIN COMPOSITE MATERIAL

TECHNICAL FIELD

The present invention relates to an exfoliated graphite oxide derivative excellent in dispersibility in a thermoplastic resin, and to a resin composite material in which the exfoliated graphite oxide derivative is uniformly dispersed in a thermoplastic resin and a process for producing the resin composite material.

BACKGROUND ART

In recent years, carbon materials having a graphene sheet structure have attracted attention because they have high modulus of elasticity and high conductivity. Such carbon materials having a graphene structure can be combined with synthetic resins to thereby reinforce products from the synthetic resins or impart conductivity thereto. In particular, graphene sheets, carbon nanotubes, thin graphite films, and the like are nano-size, and they have large specific surface areas. Therefore, when the carbon materials are combined with resins, it is believed that the above effects can be exerted more apparently.

Generally, in order to sufficiently exert such effects as a composite material, it is preferred that the carbon material be uniformly dispersed in a matrix resin. Thus, a process of providing uniform dispersion using a common solvent for the carbon material and the resin is disclosed in the following Patent Literature 1. According to this process, it is possible to obtain a resin composite material in a uniform dispersion state as long as a common solvent for the resin and the carbon material is present.

CITATION LIST

Patent Literature

Patent Literature 1:
Japanese Patent Laid-Open No. 2005-264059

SUMMARY OF INVENTION

Technical Problem

There is a problem that the carbon material has very poor dispersibility in a solvent because the carbon material has high cohesive force due to π-stacking force. Further, in the production process described in Patent Literature 1, a large amount of solvent is required in order to disperse the carbon material in a resin. Therefore, there are also problems such that the cost of a solvent is high, and it is difficult to remove the solvent.

On the other hand, exfoliated graphite oxide obtained by oxidizing exfoliated graphite has a weak π-stacking force because it has an $sp^3$ structure. Further, the exfoliated graphite oxide has a large steric hindrance because it has functional groups such as a hydroxy group, a carboxyl group, and an epoxy group on the surface thereof. Therefore, the exfoliated graphite oxide is generally known for better dispersibility than exfoliated graphite.

However, the exfoliated graphite oxide has high cohesive force due to polarity because it has highly polar groups as described above on the surface thereof. Therefore, it shows poor dispersibility in a low-polar thermoplastic resin such as polyolefin. Consequently, there is a problem that it is difficult to prepare a uniform composite material with a thermoplastic resin.

An object of the present invention is to provide an exfoliated graphite oxide derivative excellent in dispersibility in a thermoplastic resin, and a resin composite material of the exfoliated graphite oxide derivative and a thermoplastic resin and a process for producing the resin composite material.

Solution to Problem

The exfoliated graphite oxide derivative of the present invention is obtained by reacting an exfoliated graphite oxide having a C/O ratio as determined by elemental analysis of 8 or less with at least one compound selected from the group consisting of a compound having a structure of formula (1), a compound having a structure of formula (2), a compound having a structure of formula (3), and a compound having a structure of formula (4).

[Formula 1]

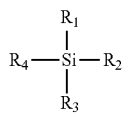

(1)

In formula (1), $R_1$ to $R_4$ each represent a functional group independently selected from the group consisting of a silyl group, a siloxy group, an alkoxy group, a vinyl group, a chlorine atom, an aryl group, an alkyl group, an ether group, an ester group, an amine group, an amide group, a hydrogen atom, a thiol group, and an epoxy group, and at least one of $R_1$ to $R_4$ is a siloxy group or an alkoxy group.

[Formula 2]

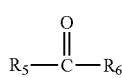

(2)

In formula (2), $R_5$ and $R_6$ each represent a functional group independently selected from the group consisting of an alkyl group, an aryl group, a vinyl group, an ether group, an alkoxy group, a chlorine atom, and a hydroxy group, and at least one of $R_5$ and $R_6$ is a functional group of any of a chlorine atom, an alkoxy group, and a hydroxy group.

[Formula 3]

(3)

In formula (3), $R_7$ represents a functional group of any of an alkyl group, an aryl group, an ether group, and a vinyl group.

[Formula 4]

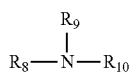

(4)

In formula (4), $R_8$ to $R_{10}$ each represent an alkyl group or hydrogen, and at least one of $R_8$ to $R_{10}$ is an alkyl group having 8 or more carbon atoms.

The resin composite material of the present invention comprises the exfoliated graphite oxide derivative and a thermoplastic resin. The thermoplastic resin is preferably polyolefin. Polyolefin is preferably polypropylene.

The process for producing a resin composite material of the present invention includes kneading the exfoliated graphite oxide derivative and a thermoplastic resin to thereby disperse the exfoliated graphite oxide derivative in the thermoplastic resin.

Advantageous Effects of Invention

In the exfoliated graphite oxide derivative of the present invention, highly polar groups on the surface of the exfoliated graphite oxide are modified with at least one compound selected from the group consisting of a compound having a structure of formula (1), a compound having a structure of formula (2), a compound having a structure of formula (3), and a compound having a structure of formula (4) to thereby reduce the polarity of the surface of the exfoliated graphite oxide derivative. Further, the steric hindrance by the functional groups of the exfoliated graphite oxide derivative increases due to the higher bulkiness of the functional groups modified with the compounds as described above. This reduces the cohesive force of the exfoliated graphite oxide derivative. In addition, in the exfoliated graphite oxide of the present invention, the cohesive force of the exfoliated graphite oxide is smaller because the C/O ratio as determined by elemental analysis of the exfoliated graphite oxide is 8 or less.

As described above, the present invention can provide a resin composite material in which exfoliated graphite oxide is uniformly dispersed in a thermoplastic resin and which has increased mechanical strength. In particular, the present invention can provide an exfoliated graphite oxide derivative which is excellent in dispersibility in a low-polar thermoplastic resin such as a polyolefin resin and can effectively increase the mechanical strength of the thermoplastic resin.

Further, in the resin composite material of the present invention, the exfoliated graphite oxide derivative is uniformly dispersed in a thermoplastic resin. Therefore, the present invention can provide a resin composite material having increased mechanical strength by the reinforcing effect of the exfoliated graphite oxide derivative.

In addition, the process for producing a resin composite material of the present invention can produce a resin composite material in which the exfoliated graphite oxide derivative is uniformly dispersed in the thermoplastic resin.

DESCRIPTION OF EMBODIMENTS

Hereinafter, the present invention will be clarified by describing specific embodiments of the present invention.
(Exfoliated Graphite Oxide Derivative)

The exfoliated graphite oxide derivative of the present invention is obtained by reacting an exfoliated graphite oxide having a C/O ratio as determined by elemental analysis of 8 or less with at least one compound selected from the group consisting of a compound having a structure of formula (1), a compound having a structure of formula (2), a compound having a structure of formula (3), and a compound having a structure of formula (4). Note that, in the present invention, the C/O ratio as determined by elemental analysis refers to the ratio of the number of moles of carbon atoms to the number of moles of oxygen atoms as determined by elemental analysis.

In the present invention, the exfoliated graphite oxide refers to a material obtained by subjecting original graphite to exfoliation followed by oxidation or obtained by subjecting graphite oxide to exfoliation, and refers to a laminate of oxidized graphene sheets each having a smaller thickness than that of original graphite or graphite oxide. The number of the oxidized graphene sheets laminated in the exfoliated graphite oxide may be smaller than that of the original graphite or graphite oxide, but is generally several layers to about 200 layers.

The exfoliated graphite oxide has a weaker π-stacking force than the exfoliated graphite because the exfoliated graphite oxide has an $sp^3$ structure. Further, the exfoliated graphite oxide has a large steric hindrance because it has functional groups such as a hydroxy group, a carboxyl group, and an epoxy group on the surface thereof. The cohesive force of the exfoliated graphite oxide is reduced by the above effect. Therefore, the exfoliated graphite oxide generally has higher dispersibility than exfoliated graphite.

Further, the functional groups such as a hydroxy group, a carboxyl group, and an epoxy group on the surface of the exfoliated graphite oxide are modified with at least one compound selected from the group consisting of a compound having a structure of formula (1), a compound having a structure of formula (2), a compound having a structure of formula (3), and a compound having a structure of formula (4) to thereby reduce the polarity of the surface of the exfoliated graphite oxide derivative. This reduces the cohesive force of the exfoliated graphite oxide derivative in a nonpolar thermoplastic resin such as polyolefin. In addition, the steric hindrance by the functional groups of the exfoliated graphite oxide derivative increases more due to the bulkiness of the functional groups modified with the compounds as described above. This further reduces the cohesive force of the exfoliated graphite oxide derivative.

Therefore, the exfoliated graphite oxide derivative has high dispersibility in a nonpolar thermoplastic resin such as polyolefin.

The exfoliated graphite oxide has a shape having a relatively large aspect ratio. In the present invention, the aspect ratio shall refer to the ratio of the maximum size in the lamination plane direction of the exfoliated graphite oxide to the thickness of the exfoliated graphite oxide. When the aspect ratio is too low, the reinforcing effect against the external force applied in the direction crossing the lamination plane may not be sufficient. On the other hand, even if the aspect ratio is too high, the effect may be saturated and a reinforcing effect beyond it may be unable to be expected. Therefore, a preferred lower limit of the aspect ratio is 50, and a preferred upper limit is 5000.

With respect to the proportion of oxygen atoms contained in the exfoliated graphite oxide, the C/O ratio as determined by elemental analysis of the exfoliated graphite oxide is 8 or less. This leads to a smaller cohesive force of the exfoliated graphite oxide. As a result, the dispersibility of the exfoliated graphite oxide is effectively increased.

The blending ratio of the compounds each having a structure of any of formulae (1) to (4) relative to the exfoliated graphite oxide is not particularly limited, but, for example, it is preferably in the range of 1 mmol to 6000 mmol relative to 1 g of the exfoliated graphite oxide.

[Formula 5]

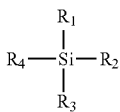
(1)

In formula (1), $R_1$ to $R_4$ each represent a functional group independently selected from the group consisting of a silyl group, a siloxy group, an alkoxy group, a vinyl group, a chlorine atom, an aryl group, an alkyl group, an ether group, an ester group, an amine group, an amide group, a hydrogen atom, a thiol group, and an epoxy group. Preferably, $R_1$ to $R_4$ are each independently selected from the group consisting of an alkyl group, an alkoxy group, and a siloxy group. Further, at least one of $R_1$ to $R_4$ is a siloxy group or an alkoxy group. When $R_1$ to $R_4$ each contain a hydrocarbon group, the hydrocarbon group may have a branched or cyclic structure.

[Formula 6]

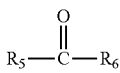
(2)

In formula (2), $R_5$ and $R_6$ are each independently selected from the group consisting of an alkyl group, an aryl group, a vinyl group, an ether group, an alkoxy group, a chlorine atom, and a hydroxy group. Preferably, $R_5$ and $R_6$ each represent a functional group independently selected from the group consisting of an alkyl group, a chlorine atom, an alkoxy group, and a hydroxy group. Further, at least one of $R_5$ and $R_6$ is any of a chlorine atom, an alkoxy group, and a hydroxy group.

When $R_5$ or $R_6$ contains a hydrocarbon group, the number of carbon atoms of the hydrocarbon group is not particularly limited, but it is preferably 5 or more. When the number of carbon atoms is 5 or more, the dispersibility of the exfoliated graphite oxide derivative can be effectively increased. More preferably, the number of carbon atoms of the hydrocarbon group is 10 or more. Further, the hydrocarbon group may have a branched or cyclic structure.

[Formula 7]

$$O=C=N-R_7 \quad (3)$$

In formula (3), $R_7$ is a functional group of any of an alkyl group, an aryl group, an ether group, and a vinyl group. The number of carbon atoms of $R_7$ is not particularly limited, but it is preferably 5 or more. When the number of carbon atoms is 5 or more, the dispersibility of the exfoliated graphite oxide derivative can be effectively increased. More preferably, the number of carbon atoms of $R_7$ is 10 or more. Further, $R_7$ may have a branched or cyclic structure.

[Formula 8]

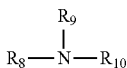
(4)

In formula (4), $R_8$ to $R_{10}$ each represent an alkyl group or hydrogen, and at least one of $R_8$ to $R_{10}$ is an alkyl group having 8 or more carbon atoms. The compound having a structure of formula (4) may be any of a primary amine, a secondary amine, or a tertiary amine. Examples of the primary amine include n-octylamine, n-nonylamine, n-decylamine, n-undecylamine, n-dodecylamine, n-tridecylamine, n-tetradecylamine, n-pentadecylamine, n-hexadecylamine, n-heptadecylamine, and n-octadecylamine. When a compound having a structure of formula (4) is a secondary amine or a tertiary amine, as long as the number of carbon atoms of at least one alkyl group contained in the compound having a structure of formula (4) is 8 or more, the number of carbon atoms of other alkyl groups contained in the compound having a structure of formula (4) may be less than 8.

(Resin Composite Material)

The resin composite material of the present invention comprises the exfoliated graphite oxide derivative and the thermoplastic resin. As described above, the exfoliated graphite oxide derivative has high dispersibility in a nonpolar solvent such as a thermoplastic resin. Therefore, in the resin composite material of the present invention, the exfoliated graphite oxide derivative is uniformly dispersed in the thermoplastic resin. Consequently, the reinforcing effect against the external force applied in the direction crossing the lamination plane of the exfoliated graphite oxide can be effectively increased.

The blending ratio of the exfoliated graphite oxide derivative is not particularly limited, but it is preferably in the range of 0.5 to 40 parts by weight relative to 100 parts by weight of the thermoplastic resin. If it is less than 0.5 part by weight, the reinforcing effect by the exfoliated graphite oxide derivative may be insufficient. If it exceeds 40 parts by weight, the resulting resin composite material may be brittle and easily cracked while high rigidity may be obtained.

Examples of the thermoplastic resin include, but are not particularly limited to, polyethylene, polypropylene, polyethylene-based resins such as an ethylene homopolymer, an ethylene-α-olefin copolymer, an ethylene-(meth)acrylic acid copolymer, an ethylene-(meth)acrylate copolymer, and an ethylene-vinyl acetate copolymer, polypropylene-based resins such as a propylene homopolymer, a propylene-α-olefin copolymer, a propylene-ethylene random copolymer, and a propylene-ethylene block copolymer, a butene homopolymer, homopolymers or copolymers of a conjugated diene such as butadiene and isoprene, polyether sulfone, polyether ketone, polyether imide, polyvinyl chloride, polytetrafluoroethylene, polyphenylene ether, polyphenylene sulfide, polyamide, polyester, polysiloxane, polyurethane, and polybenzoxazole. A preferred thermoplastic resin includes polypropylene. Since a thermoplastic resin can be easily shaped under heating, the resin composite material of the present invention comprising a thermoplastic resin can be processed into various shaped articles under heating using various molding and/or forming methods.

(Production Process)

Next, the process for producing the exfoliated graphite oxide derivative of the present invention will be described.

In the process for producing the exfoliated graphite oxide derivative of the present invention, the exfoliated graphite oxide derivative and the thermoplastic resin are kneaded to thereby disperse the exfoliated graphite oxide derivative in the thermoplastic resin. Specifically, there are first prepared exfoliated graphite oxide and at least one compound (hereinafter referred to as "surface treatment agent") selected from the group consisting of the compound having a structure of formula (1), the compound having a structure of formula (2), the compound having a structure of formula (3), and the compound having a structure of formula (4).

Next, the exfoliated graphite oxide and the surface treatment agent are dispersed in a solvent. The solvent is not particularly limited, but in order to disperse the exfoliated graphite oxide and the surface treatment agent in the solvent, the solvent preferably has a high polarity. Examples of the solvent which can be used include water, alcohol, tetrahydrofuran, N-methyl-2-pyrrolidone, dimethyl sulfoxide, N,N-dimethylformamide, N,N-dimethylacetamide, acetone, chlorobenzene, dichlorobenzene, dichlorobenzene, and chloroform. Preferred examples of the solvent which can be used include water, alcohol, tetrahydrofuran, N-methyl-2-pyrrolidone, dimethyl sulfoxide, N,N-dimethylformamide, and N,N-dimethylacetamide. Further, the solvent may be acidic, neutral, or basic depending on the properties of the surface treatment agent.

The process for dispersing the exfoliated graphite oxide and the surface treatment agent is not particularly limited, but, for example, they can be dispersed by applying an ultrasonic wave to the solvent. The exfoliated graphite oxide and the surface treatment agent may be dispersed at the same time or may be separately dispersed.

Next, the exfoliated graphite oxide and the surface treatment agent are mixed in the solvent in which the exfoliated graphite oxide and the surface treatment agent are dispersed. The mixing conditions are not particularly limited, but are suitably selected depending on the surface treatment agent, the solvent, and the like to be used.

The reaction temperature may preferably be −20 to 200° C. If the reaction temperature is too high, the surface treatment agent, the solvent, and the exfoliated graphite oxide may deteriorate. If the reaction temperature is too low, the reaction of the exfoliated graphite oxide with the surface treatment agent may not proceed satisfactorily. The reaction temperature may more preferably be 0 to 150° C.

The mixing time may preferably be 3 minutes to 96 hours. If the mixing time is too long, the surface treatment agent, the solvent, and the exfoliated graphite oxide may deteriorate. If the mixing time is too short, the reaction of the exfoliated graphite oxide with the surface treatment agent may not proceed satisfactorily. The mixing time may more preferably be 30 minutes to 72 hours.

The solvent and unreacted surface treatment agent can be removed after the reaction to thereby obtain the exfoliated graphite oxide derivative of the present invention. The process for removing the solvent and the unreacted surface treatment agent is not particularly limited, but examples thereof can include filtration, ultrasonic cleaning, and evaporation.

The process for producing the resin composite material of the present invention is not particularly limited, but the exfoliated graphite oxide derivative of the present invention can be mixed with a thermoplastic resin by a known process to thereby obtain the resin composite material of the present invention. For example, the exfoliated graphite oxide derivative of the present invention can be melt-kneaded with a thermoplastic resin to thereby obtain the resin composite material of the present invention.

Hereinafter, the present invention will be clarified by referring to specific Examples of the present invention. Note that the present invention is not limited to the following Examples.

The following materials were used in Examples and Comparative Examples.
(1) Carbon Material
Graphite: trade name "SNO-5" having an average particle size of 5 μm and a specific surface area of 15 m$^2$/g, manufactured by SEC Carbon, Limited
Carbon nanotube (CNT): trade name "C2151", manufactured by Tokyo Chemical Industry Co., Ltd.

(2) Matrix Resin
Polypropylene (PP): trade name "J-721GR", manufactured by Prime Polymer Co., Ltd.
Polyethylene (PE): trade name "7800M", manufactured by Prime Polymer Co., Ltd.
Polycarbonate: trade name "R2200", manufactured by Idemitsu Kosan Co., Ltd.
Polyester: trade name "5010R3-2", manufactured by Mitsubishi Engineering-Plastics Corporation
Polyamide: trade name "N1000A", manufactured by Kuraray Co., Ltd.
Polystyrene: trade name "CR-3500", manufactured by DIC Corporation
Polymethyl methacrylate: trade name "VH001", manufactured by Mitsubishi Rayon Co., Ltd.
(3) Treatment Agent
Siloxy oligomer: trade name "KR-500", manufactured by Shin-Etsu Chemical Co., Ltd.
Reagents manufactured by Tokyo Chemical Industry Co., Ltd. were used as other treatment agents.
(Exfoliated Graphite Oxide)
The exfoliated graphite oxide used in Examples and Comparative Examples was produced by the following processes 1 to 4.
1. The exfoliated graphite oxide having a C/O ratio=2 as determined by elemental analysis was produced by the process of Hummers (see J. Chem. Soc. W. S. Hummers et. al. 1958, 80, 1339).
2. The exfoliated graphite oxide having a C/O ratio=8 as determined by elemental analysis was produced by heating the exfoliated graphite oxide having a C/O ratio =2 at 200° C. for 2 hours in the air.
3. The exfoliated graphite oxide having a C/O ratio=10 as determined by elemental analysis was produced by heating the exfoliated graphite oxide having a C/O ratio =2 at 200° C. for 5 hours in the air.
4. The exfoliated graphite oxide having a C/O ratio=12 as determined by elemental analysis was produced by heating the exfoliated graphite oxide having a C/O ratio =2 at 200° C. for 8 hours in the air.

(Production of Exfoliated Graphite Oxide Derivative)
In Examples and Comparative Examples, the exfoliated graphite oxide was treated with the following treatment methods A to D to obtain the exfoliated graphite oxide derivatives.
A: Three types of compounds as shown below were used as the examples of the compound having a structure of formula (1) to obtain exfoliated graphite oxide derivatives.
A-1: Treatment with Methyltriethoxysilane
The exfoliated graphite oxide was dispersed in a water/ethanol (50/50) mixed solution using an ultrasonic wave to obtain a mixture having an exfoliated graphite oxide concentration of 1 mg/ml. Next, acetic acid was added to the mixture to adjust the pH of the mixture to 5. Subsequently, thereto was added methyltriethoxysilane so that the mass % of methyltriethoxysilane in the mixture might be 0.5 mass %. Next, the obtained mixture was sonicated for 1 hour, and ethanol was evaporated at room temperature. Next, the obtained mixture was heated at 120° C. for 2 hours. Next, the obtained mixture was sonicated in acetone, and the resulting mixture was filtered to remove the liquid to obtain an exfoliated graphite oxide derivative.
A-2: Treatment with Phenyltriethoxysilane
An exfoliated graphite oxide derivative was obtained in the same manner as in A-1 except that phenyltriethoxysilane was used instead of methyltriethoxysilane.

A-3: Treatment with Siloxy Oligomer

An exfoliated graphite oxide derivative was obtained in the same manner as in A-1 except that a siloxy oligomer was used instead of methyltriethoxysilane.

B: Three types of compounds as shown below were used as the examples of the compound having a structure of formula (2) to obtain exfoliated graphite oxide derivatives.

B-1: Treatment with Decanoic Acid Chloride

In 5 L of DMF, were dispersed 5.0 g of exfoliated graphite oxide, 50 g of decanoic acid chloride, and 21 g of pyridine using an ultrasonic wave. Next, the obtained mixture was stirred at 130° C. for 72 hours in a nitrogen atmosphere. Next, the mixture was charged into 5 L of toluene, and the resulting mixture was filtered to remove the liquid to obtain a product. Subsequently, the obtained product was ultrasonically cleaned in acetone, and the resulting mixture was filtered to remove the liquid and the unreacted material to obtain an exfoliated graphite oxide derivative.

B-2: Treatment with Decanoic Acid

Decanoic acid in an amount of 5000 g was sonicated in a hot bath to disperse 5.0 g of exfoliated graphite oxide. Next, the mixture was stirred at 120° C. for 2 hours in a reduced pressure (0.1 mmHg) while removing water from the mixture. Next, the obtained mixture was ultrasonically cleaned in 5 L of acetone, and the resulting mixture was filtered. The ultrasonic cleaning and filtration were performed twice in total to remove the liquid and the unreacted material to obtain an exfoliated graphite oxide derivative.

B-3: Treatment with Methyl Decanoate

Methyl decanoate in an amount of 5000 g was sonicated to disperse 5.0 g of exfoliated graphite oxide. Next, this mixture was stirred at 150° C. for 2 hours to remove methanol produced. Next, the liquid component was removed from the obtained mixture by filtration. Next, the obtained solid was ultrasonically cleaned in 5 L of acetone, and the resulting mixture was filtered to remove the unreacted material to obtain an exfoliated graphite oxide derivative.

C: Three types of compounds as shown below were used as the examples of the compound having a structure of formula (3) to obtain exfoliated graphite oxide derivatives.

C-1: Treatment with Octadecyl Isocyanate

In 5 L of DMF, were dispersed 5.0 g of exfoliated graphite oxide, 50 g of octadecyl isocyanate, and 1 g of triethylamine using an ultrasonic wave. Next, the obtained mixture was stirred at 130° C. for 72 hours in a nitrogen atmosphere. Next, the obtained mixture was charged into 5 L of toluene, and the resulting mixture was filtered to remove the liquid. Subsequently, the obtained product was ultrasonically cleaned in toluene, and the resulting mixture was filtered to remove the liquid and the unreacted material to obtain an exfoliated graphite oxide derivative.

C-2: Treatment with Phenyl Isocyanate

An exfoliated graphite oxide derivative was obtained in the same manner as in C-1 except that phenyl isocyanate was used instead of octadecyl isocyanate.

C-3: Treatment with 4-Ethoxyphenyl Isocyanate

An exfoliated graphite oxide derivative was obtained in the same manner as in C-1 except that 4-ethoxyphenyl isocyanate was used instead of octadecyl isocyanate.

D: Three types of compounds as shown below were used as the examples of the compound having a structure of formula (4) to obtain exfoliated graphite oxide derivatives.

D-1: Treatment with n-Octylamine

Exfoliated graphite oxide was mixed in DMF to obtain 1 mg/ml of an exfoliated graphite oxide/DMF mixture. Next, to the obtained mixture, was added 10 mmol of n-octylamine per 1 g of the exfoliated graphite. Subsequently, the exfoliated graphite oxide and n-octylamine were dispersed in the mixture using an ultrasonic wave. Next, the dispersed mixture was stirred for 3 days at 120° C. Next, the obtained mixture was poured into toluene in an amount corresponding to about 5 times the weight of the mixture, and the resulting mixture was stirred for 15 minutes. Subsequently, the stirred mixture was filtered to remove the liquid and the unreacted material from the stirred mixture to obtain an exfoliated graphite oxide derivative.

D-2: Treatment with n-Dodecylamine

An exfoliated graphite oxide derivative was obtained in the same manner as in D-1 except that n-dodecylamine was used instead of n-octylamine.

D-3: Treatment with Didodecylamine

An exfoliated graphite oxide derivative was obtained in the same manner as in D-1 except that didodecylamine was used instead of n-octylamine.

D-4: Treatment with n-Butylamine

An exfoliated graphite oxide derivative was obtained in the same manner as in D-1 except that n-butylamine was used instead of n-octylamine.

(Production of Resin Composite Material Sheet)

In combinations as shown in Tables 1 to 5, 100 mass parts of the matrix resin and 5 mass parts of the exfoliated graphite oxide derivative obtained by any of the treatment methods A to D were supplied to a plastomill and kneaded, and the resulting kneaded material was pressed to thereby obtain a matrix resin/exfoliated graphite oxide resin composite material sheet having a thickness of 1 mm.

(Tensile Modulus of Elasticity)

The tensile modulus of elasticity at 23° C. of the obtained resin composite material sheet was measured according to JIS K6767. The tensile modulus of elasticity of each composite material of an exfoliated graphite derivative obtained by any of the treatment methods A to D and a resin is shown in Tables 1 to 4, respectively. Further, the tensile modulus of elasticity was measured in the same manner also for the composite material sheets obtained using the exfoliated graphite oxide which was not subjected to any of the treatment methods A to D and a matrix resin. These results are shown in Table 5.

TABLE 1

|  | Exfoliated graphite oxide (C/O ratio) | Treatment method | Matrix resin | Tensile modulus of elasticity (GPa) |
| --- | --- | --- | --- | --- |
| Example 1A | 8 | A-1 | PP | 4.8 |
| Example 2A | 2 | A-1 |  | 5.0 |
| Example 3A | 8 | A-2 |  | 4.5 |
| Example 4A | 2 | A-2 |  | 4.8 |
| Example 5A | 8 | A-3 |  | 4.7 |
| Example 6A | 2 | A-3 |  | 4.6 |
| Example 7A | 8 | A-1 | PE | 4.5 |
| Example 8A | 8 | A-1 | Polycarbonate | 5.3 |
| Example 9A | 8 | A-1 | Polyester | 5.5 |

TABLE 1-continued

| | Exfoliated graphite oxide (C/O ratio) | Treatment method | Matrix resin | Tensile modulus of elasticity (GPa) |
|---|---|---|---|---|
| Example 10A | 8 | A-1 | Polyamide | 5.4 |
| Example 11A | 8 | A-1 | Polystyrene | 6.2 |
| Example 12A | 8 | A-1 | Polymethyl methacrylate | 6.2 |
| Comp. Ex. 1A | 10 | A-1 | PP | 2.6 |
| Comp. Ex. 2A | 10 | A-2 | | 2.2 |
| Comp. Ex. 3A | 10 | A-3 | | 2.1 |
| Comp. Ex. 4A | 12 | A-1 | | 2.5 |
| Comp. Ex. 5A | 12 | A-2 | | 2.2 |
| Comp. Ex. 6A | 12 | A-3 | | 2.2 |
| Comp. Ex. 7A | 10 | A-1 | PE | 2.3 |
| Comp. Ex. 8A | 10 | A-1 | Polycarbonate | 3.3 |
| Comp. Ex. 9A | 10 | A-1 | Polyester | 3.5 |
| Comp. Ex. 10A | 10 | A-1 | Polyamide | 3.5 |
| Comp. Ex. 11A | 10 | A-1 | Polystyrene | 4.2 |
| Comp. Ex. 12A | 10 | A-1 | Polymethyl methacrylate | 4.0 |

TABLE 2

| | Exfoliated graphite oxide (C/O ratio) | Treatment method | Matrix resin | Tensile modulus of elasticity (GPa) |
|---|---|---|---|---|
| Example 1B | 8 | B-1 | PP | 4.8 |
| Example 2B | 2 | B-1 | | 5.0 |
| Example 3B | 8 | B-2 | | 4.5 |
| Example 4B | 2 | B-2 | | 4.8 |
| Example 5B | 8 | B-3 | | 4.7 |
| Example 6B | 2 | B-3 | | 4.6 |
| Example 7B | 8 | B-1 | PE | 4.6 |
| Example 8B | 8 | B-1 | Polycarbonate | 5.3 |
| Example 9B | 8 | B-1 | Polyester | 5.5 |
| Example 10B | 8 | B-1 | Polyamide | 5.5 |
| Example 11B | 8 | B-1 | Polystyrene | 6.4 |
| Example 12B | 8 | B-1 | Polymethyl methacrylate | 6.3 |
| Comp. Ex. 1B | 10 | B-1 | PP | 2.3 |
| Comp. Ex. 2B | 10 | B-2 | | 2.2 |
| Comp. Ex. 3B | 10 | B-3 | | 2.2 |
| Comp. Ex. 4B | 12 | B-1 | | 2.1 |
| Comp. Ex. 5B | 12 | B-2 | | 2.1 |
| Comp. Ex. 6B | 12 | B-3 | | 2.0 |
| Comp. Ex. 7B | 10 | B-1 | PE | 2.4 |
| Comp. Ex. 8B | 10 | B-1 | Polycarbonate | 3.3 |
| Comp. Ex. 9B | 10 | B-1 | Polyester | 3.4 |
| Comp. Ex. 10B | 10 | B-1 | Polyamide | 3.5 |
| Comp. Ex. 11B | 10 | B-1 | Polystyrene | 4.1 |
| Comp. Ex. 12B | 10 | B-1 | Polymethyl methacrylate | 4.0 |

TABLE 3

| | Exfoliated graphite oxide (C/O ratio) | Treatment method | Matrix resin | Tensile modulus of elasticity (GPa) |
|---|---|---|---|---|
| Example 1C | 8 | C-1 | PP | 4.8 |
| Example 2C | 2 | C-1 | | 5.0 |
| Example 3C | 8 | C-2 | | 4.5 |
| Example 4C | 2 | C-2 | | 4.8 |
| Example 5C | 8 | C-3 | | 4.7 |
| Example 6C | 2 | C-3 | | 4.6 |
| Example 7C | 8 | C-1 | PE | 4.5 |
| Example 8C | 8 | C-1 | Polycarbonate | 4.3 |
| Example 9C | 8 | C-1 | Polyester | 5.3 |
| Example 10C | 8 | C-1 | Polyamide | 5.6 |
| Example 11C | 8 | C-1 | Polystyrene | 6.2 |
| Example 12C | 8 | C-1 | Polymethyl methacrylate | 6.4 |
| Comp. Ex. 1C | 10 | C-1 | PP | 2.2 |
| Comp. Ex. 2C | 10 | C-2 | | 2.1 |
| Comp. Ex. 3C | 10 | C-3 | | 2.2 |
| Comp. Ex. 4C | 12 | C-1 | | 2.1 |
| Comp. Ex. 5C | 12 | C-2 | | 2.0 |
| Comp. Ex. 6C | 12 | C-3 | | 2.0 |
| Comp. Ex. 7C | 10 | C-1 | PE | 2.3 |
| Comp. Ex. 8C | 10 | C-1 | Polycarbonate | 3.2 |
| Comp. Ex. 9C | 10 | C-1 | Polyester | 3.4 |

TABLE 3-continued

|  | Exfoliated graphite oxide (C/O ratio) | Treatment method | Matrix resin | Tensile modulus of elasticity (GPa) |
|---|---|---|---|---|
| Comp. Ex. 10C | 10 | C-1 | Polyamide | 3.5 |
| Comp. Ex. 11C | 10 | C-1 | Polystyrene | 4.2 |
| Comp. Ex. 12C | 10 | C-1 | Polymethyl methacrylate | 4.0 |

TABLE 4

|  | Exfoliated graphite oxide (C/O ratio) | Treatment method | Matrix resin | Tensile modulus of elasticity (GPa) |
|---|---|---|---|---|
| Example 1D | 8 | D-1 | PP | 4.8 |
| Example 2D | 2 | D-1 |  | 5.0 |
| Example 3D | 8 | D-2 |  | 4.5 |
| Example 4D | 2 | D-2 |  | 4.8 |
| Example 5D | 8 | D-3 |  | 4.7 |
| Example 6D | 2 | D-3 |  | 4.6 |
| Example 7D | 8 | D-1 | PE | 4.7 |
| Example 8D | 8 | D-1 | Polycarbonate | 4.4 |
| Example 9D | 8 | D-1 | Polyester | 5.3 |
| Example 10D | 8 | D-1 | Polyamide | 5.6 |
| Example 11D | 8 | D-1 | Polystyrene | 6.3 |
| Example 12D | 8 | D-1 | Polymethyl methacrylate | 6.5 |
| Comp. Ex. 1D | 10 | D-1 | PP | 3.3 |
| Comp. Ex. 2D | 10 | D-2 |  | 3.3 |
| Comp. Ex. 3D | 10 | D-3 |  | 3.5 |
| Comp. Ex. 4D | 10 | D-4 |  | 2.5 |
| Comp. Ex. 5D | 12 | D-1 |  | 3.2 |
| Comp. Ex. 6D | 12 | D-2 |  | 3.4 |
| Comp. Ex. 7D | 12 | D-3 |  | 3.0 |
| Comp. Ex. 8D | 12 | D-4 |  | 2.3 |
| Comp. Ex. 9D | 10 | D-1 | PE | 2.2 |
| Comp. Ex. 10D | 10 | D-1 | Polycarbonate | 3.2 |
| Comp. Ex. 11D | 10 | D-1 | Polyester | 3.4 |
| Comp. Ex. 12D | 10 | D-1 | Polyamide | 3.4 |
| Comp. Ex. 13D | 10 | D-1 | Polystyrene | 4.4 |
| Comp. Ex. 14D | 10 | D-1 | Polymethyl methacrylate | 4.2 |
| Comp. Ex. 15D | 2 | D-4 | PP | 2.6 |
| Comp. Ex. 16D | 8 | D-4 |  | 2.4 |

TABLE 5

|  | Exfoliated graphite oxide (C/O ratio) | Treatment method | Matrix resin | Tensile modulus of elasticity (GPa) |
|---|---|---|---|---|
| Comp. Ex. 1E | 12 | Not treated | PP | 2.3 |
| Comp. Ex. 2E | 10 |  |  | 2.4 |
| Comp. Ex. 3E | 8 |  |  | 2.1 |
| Comp. Ex. 4E | 2 |  |  | 2.1 |
| Comp. Ex. 5E | 12 |  | PE | 2.0 |
| Comp. Ex. 6E | 10 |  |  | 1.9 |
| Comp. Ex. 7E | 8 |  |  | 2.1 |
| Comp. Ex. 8E | 2 |  |  | 2.1 |
| Comp. Ex. 9E | 12 |  | Polycarbonate | 2.8 |
| Comp. Ex. 10E | 10 |  |  | 2.8 |
| Comp. Ex. 11E | 8 |  |  | 2.9 |
| Comp. Ex. 12E | 2 |  |  | 2.8 |
| Comp. Ex. 13E | 12 |  | Polyester | 2.8 |
| Comp. Ex. 14E | 10 |  |  | 2.9 |
| Comp. Ex. 15E | 8 |  |  | 3.0 |
| Comp. Ex. 16E | 2 |  |  | 3.0 |
| Comp, Ex. 17E | 12 |  | Polyamide | 3.0 |
| Comp. Ex. 18E | 10 |  |  | 3.0 |
| Comp. Ex. 19E | 8 |  |  | 3.2 |
| Comp. Ex. 20E | 2 |  |  | 3.1 |
| Comp. Ex. 21E | 12 |  | Polystyrene | 3.6 |
| Comp. Ex. 22E | 10 |  |  | 3.7 |
| Comp. Ex. 23E | 8 |  |  | 3.8 |
| Comp. Ex. 24E | 2 |  |  | 3.8 |
| Comp. Ex. 25E | 12 |  | Polymethyl methacrylate | 3.4 |
| Comp. Ex. 26E | 10 |  |  | 3.6 |
| Comp. Ex. 27E | 8 |  |  | 3.5 |
| Comp. Ex. 28E | 2 |  |  | 3.5 |

The invention claimed is:

1. An exfoliated graphite oxide derivative which is obtained by reacting an exfoliated graphite oxide having a C/O ratio as determined by elemental analysis of 8 or less with at least one compound selected from the group consisting of a compound having a structure of formula (1), a compound having a structure of formula (2), a compound having a structure of formula (3), and a compound having a structure of formula (4):

[Formula 1]

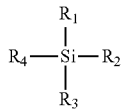

(1)

wherein $R_1$ to $R_4$ each represent a functional group independently selected from the group consisting of a silyl group, a siloxy group, an alkoxy group, a vinyl group, a chlorine atom, an aryl group, an alkyl group, an ether group, an ester group, an amine group, an amide group, a hydrogen atom, a thiol group, and an epoxy group, and at least one of $R_1$ to $R_4$ is a siloxy group or an alkoxy group;

[Formula 2]

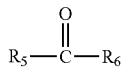

(2)

wherein $R_5$ and $R_6$ each represent a functional group independently selected from the group consisting of an alkyl group, an aryl group, a vinyl group, an ether group, an alkoxy group, a chlorine atom, and a hydroxy group, and at least one of $R_5$ and $R_6$ is any of a chlorine atom, an alkoxy group, and a hydroxy group;

[Formula 3]

O=C=N—$R_7$ (3)

wherein $R_7$ represents a functional group of any of an alkyl group, an aryl group, an ether group, and a vinyl group; and

[Formula 4]

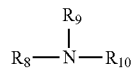

(4)

wherein $R_8$ to $R_{10}$ each represent an alkyl group or hydrogen, and at least one of $R_8$ to $R_{10}$ is an alkyl group having 8 or more carbon atoms.

2. A resin composite material comprising the exfoliated graphite oxide derivative according to claim 1 and a thermoplastic resin.

3. The resin composite material according to claim 2, wherein the thermoplastic resin is polyolefin.

4. The resin composite material according to claim 3, wherein the polyolefin is polypropylene.

5. A process for producing a resin composite material comprising kneading the exfoliated graphite oxide derivative according to claim 1 and a thermoplastic resin to thereby disperse the exfoliated graphite oxide derivative in the thermoplastic resin.

6. The exfoliated graphite oxide derivative according to claim 1, wherein $R_7$ represents a functional group of any of an alkyl group, an ether group and a vinyl group.

7. The exfoliated graphite oxide derivative according to claim 1, which is obtained by reacting an exfoliated graphite oxide having a C/O ratio as determined by elemental analysis of 8 or less with at least one compound selected from the group consisting of a compound having a structure of formula (1), a compound having a structure of formula (2), and a compound having a structure of formula (4).

* * * * *